(12) United States Patent
Riedle

(10) Patent No.: US 6,298,415 B1
(45) Date of Patent: Oct. 2, 2001

(54) METHOD AND SYSTEM FOR MINIMIZING WRITES AND REDUCING PARITY UPDATES IN A RAID SYSTEM

(75) Inventor: Linda Ann Riedle, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,414

(22) Filed: Feb. 19, 1999

(51) Int. Cl.[7] .................................................. G06F 11/10
(52) U.S. Cl. ........................... 711/114; 711/111; 711/112; 711/113; 711/4; 711/141; 711/143; 714/1; 714/6; 714/13
(58) Field of Search ................................ 711/4, 111–114, 711/141–143; 714/1, 6, 13

(56) References Cited

U.S. PATENT DOCUMENTS

| | | | |
|---|---|---|---|
| 5,408,644 | * | 4/1995 | Schneider et al. ........................ 714/1 |
| 5,809,560 | * | 9/1998 | Schneider ............................. 711/204 |
| 5,974,503 | * | 10/1999 | Venkatesh et al. ................... 711/114 |
| 6,018,778 | * | 1/2000 | Stolowitz ............................. 710/61 |
| 6,052,799 | * | 4/2000 | Li et al. ................................ 714/13 |

* cited by examiner

Primary Examiner—Than Nguyen
(74) Attorney, Agent, or Firm—Bracewell & Patterson, LLP

(57) ABSTRACT

A method and system for updating stored data with received data in a cache associated with the data storage system is provided, where the data storage system comprises N data storage drives, where data and calculated parity are striped across N data storage drives, where a stripe comprises multiple data sectors on each of N data storage drives. An associated cache is provided with the data storage system into which data is received. The data in the cache is periodically examined to determine if the cache includes all sequential data sectors contained within a complete stripe within the data storage system. Parity is calculated for the complete stripe by first calculating a range of sectors between which all sectors received into the cache for the complete stripe fall. Next, only those sectors within the range of sectors which are not included in the data in the cache for the complete stripe are read from the N data storage drives into the cache. Finally, the range of sectors in the cache for the complete stripe are logically combined. The parity is calculated such that input/output operations within said data storage system are minimized.

13 Claims, 7 Drawing Sheets

| | D1 | D2 | D3 | P1 |
|---|---|---|---|---|
| Sector 0 | S0 | S0 | S0 | S0 |
| | S1 | S1 | S1 | S1 |
| | S2 | S2 | S2 | S2 |
| | S3 | S3 | S3 | S3 |
| | S4 | S4 | S4 | S4 |
| | S5 | S5 | S5 | S5 |
| | S6 | S6 | S6 | S6 |
| | S7 | S7 | S7 | S7 |
| | S8 | S8 | S8 | S8 |
| | S9 | S9 | S9 | S9 |
| | S10 | S10 | S10 | S10 |
| | S11 | S11 | S11 | S11 |
| | S12 | S12 | S12 | S12 |
| | S13 | S13 | S13 | S13 |
| | S14 | S14 | S14 | S14 |
| Sector 15 | S15 | S15 | S15 | S15 |

| Page A D1' (160) | Page B D2' (162) | Page C D3' (164) | Page D P1' (166) |
|---|---|---|---|
| S2 | S2' | S2 | S2' |
| S3 | S3 | S3' | S3' |
| S4 | S4 | S4 | S4' |
| S5 | S5 | S5 | S5' |
| S6 | S6 | S6' | S6' |
| S7' | S7 | S7 | S7' |
| S8 | S8' | S8 | S8' |
| S9 | S9 | S9 | S9' |
| S10' | S10 | S10 | S10' |
| S11 | S11' | S11 | S11' |
| S12 | S12 | S12 | S12' |
| S13 | S13 | S13 | S13' |
| S14 | S14 | S14' | S14' |
|  |  |  |  |

Sector 0 ... Sector 15

*Fig. 6*

| Sector Number | Storage Position |
|---|---|
| 2 | Page A / S2 |
| 3 | Page A / S3 |
| 4 | Page A / S4 |
| 5 | Page A / S5 |
| 6 | Page A / S6 |
| 7 | Garbage Page |
| 8 | Page A / S8 |
| 9 | Page A / S9 |
| 10 | Garbage Page |
| 11 | Page A / S11 |
| 12 | Page A / S12 |
| 13 | Page A / S13 |
| 14 | Page A / S14 |

Fig. 7

|  | Reads | Writes | XOR Calculations |
|---|---|---|---|
| Sector by Sector | Min 8-Max 16 | 16 | 8 |
| Stripe by Stripe | 3 | 4 | 1 |

Fig. 8

METHOD AND SYSTEM FOR MINIMIZING WRITES AND REDUCING PARITY UPDATES IN A RAID SYSTEM

CROSS-REFERENCE TO RELATED APPLICATIONS

The present application is related to the following copending applications, which are filed on even date herewith and incorporated herein by reference:

(1) U.S. patent application Ser. No. 09/253,413; and (2) U.S. patent application Ser. No. 09/253,415.

BACKGROUND OF THE INVENTION

1. Field of the Invention

The present invention relates in general to improved data storage systems and in particular to an improved method and system for updating stored data in a data storage system. Still more particularly, the present invention relates to an improved method and system for increasing performance of a data storage system in updating stored data utilizing non-contiguous data in a cache associated with the data storage system.

2. Description of the Related Art

As the performance of microprocessor and is semiconductor memory technology increases, there is a need for improved data storage systems with comparable performance enhancements. Additionally, in enhancing the performance of data storage systems, there is a need for improved reliability of data stored. In 1988, a paper was published by Patterson, Gibson, Katz, A Case for Redundant Arrays of Inexpensive Disks (RAID), International Conference on Management of Data, pgs. 109–116, June 1988. This paper laid the foundation for the use of redundant arrays of inexpensive disks that would not only improve the data transfer rate and data I/O rate over a comparable single disk access, but would also provide error correction at a lower cost in data storage systems.

RAID includes an array of disks which are typically viewed by a host, such as a computer system, as a single disk. A RAID controller may be a hardware and/or software tool for providing an interface between the host and the array of disks. Preferably, the RAID controller manages the array of disks for storage and retrieval and can view the disks of the RAID separately. The disks included in the array may be any type of data storage systems which can be controlled by the RAID controller when grouped in the array.

The RAID controller is typically configured to access the array of disks as defined by a particular "RAID level." The RAID level specifies how the data is distributed across the disk drives and how error correction is accomplished. In the paper noted above, the authors describe five RAID levels (RAID Level 1–RAID level 5). Since the publication of the paper, additional RAID levels have been designated.

RAID levels are typically distinguished by the benefits included. Three key benefits which may be included in a RAID level are fault tolerance, data availability and high performance. Fault tolerance is typically achieved through an error correction method which ensures that information can be reconstructed in the event of a disk failure. Data availability allows the data array to continue to operate with a failed component. Typically, data availability is achieved through a method of redundancy. Finally, high performance is typically achieved by simultaneous access to multiple disk drives which results in faster I/O and data transfer requests.

Error correction is accomplished, in many RAID levels, by utilizing additional parity data stored with the original data. Parity data may be utilized to recover lost data due to disk failure. Parity data is typically stored on one or more disks dedicated for error correction only, or distributed over all of the disks within an array.

By the method of redundancy, data is stored in multiple disks of the array. Redundancy is a benefit in that redundant data allows the storage system to continue to operate with a failed component while data is being replaced through the error correction method.

Additionally, redundant data is more beneficial than back-up data because back-up data is typically outdated when needed whereas redundant data is current when needed.

In many RAID levels, redundancy is incorporated through data interleaving which distributes the data over all of the data disks in the array. Data interleaving is usually in the form of data "striping" in which data to be stored is broken down into blocks called "stripe units" which are then distributed across the array of disks. Stripe units are typically predefined as a bit, byte, block or other unit. Stripe units are further broken into a plurality of sectors where all sectors are an equivalent predefined size. A "stripe" is a group of corresponding stripe units, one stripe unit from each disk in the array. Thus, "stripe size" is equal to the size of a stripe unit times the number of data disks in the array.

In an example, RAID level 5 utilizes data interleaving by striping data across all disks and provides for error correction by distributing parity data across all disks. For each stripe, all stripe units are logically combined with each of the other stripe units to calculate parity for the stripe. Logical combination is typically accomplished by an exclusive or (XOR) of the stripe units. For N physical drives, N–1 of the physical drives will receive a stripe unit for the stripe and the Nth physical drive will receive the parity for the stripe. For each stripe, the physical drive receiving the parity data rotates such that all parity data is not contained on a single disk. I/O request rates for RAID level 5 are high because the distribution of parity data allows the system to perform multiple read and write functions at the same time. RAID level 5 offers high performance, data availability and fault tolerance for the data disks.

Disk arrays are preferably configured to include logical drives which divide the physical drives in the disk array into logical components which may be viewed by the host as separate drives. Each logical drive includes a cross section of each of the physical drives and is assigned a RAID level. For example, a RAID system may include 10 physical drives in the array. The RAID system is accessible by a network of 4 users and it is desirable that each of the users have separate storage on the disk array. Therefore the physical drives will be divided into at least four logical drives where each user has access to one of the logical drives. Logical drive 1 needs to be configured to RAID level 5. Therefore, data will be interleaved across the cross sections of nine of the physical drives utilized by logical drive 1 and parity data will be stored in the cross section of the remaining physical drive.

A host computer may provide data to the data storage system. The data is preferably received into a cache associated with the RAID controller. When data is received into the cache, the RAID controller can return a signal to the host computer that the data has been received even though the data has not been stored in the data storage drives. By receiving data into the cache before storage as stripes in the data storage drives, the performance of the data storage system may be enhanced.

Data previously striped across the data storage drives may be updated by new data received into pages of a cache associated with the data storage system. Data received for updating previously stored data is considered dirty data until written to the data disks and the dirty data indicator turned off. The dirty data in the cache may include sufficient pages of data to completely update at least one stripe or may include pages of data to update stripe units of multiple stripes. Pages of data may include all sectors for a stripe unit or an assortment of sectors for a stripe unit.

Before dirty data may be flushed to the data storage drives, updated parity must be calculated for the stripe which will be updated with dirty data. If all the sectors for a stripe unit are included in a dirty data page and all the stripe units for the stripe are also included in the pages of dirty data, then the updated parity for the stripe may be calculated and the dirty data sectors flushed together. However, if an assortment of sectors for a stripe unit are included in a page of dirty data, the updated parity may not be calculated for the entire stripe without further fetching of stripe units from the data storage drives.

Typically, when an assortment of sectors are to be updated, the parity for each sector is calculated and the sector and parity are written sector by sector. For example, if sector 7 of a stripe unit D4 of stripe 2 is to be updated, then using a method termed the RMW method, the parity would be calculated by fetching the old sector 7 of stripe unit D4 of stripe 2 and the old parity sector 7 of stripe 2 into additional pages in the cache if each of the data is not already in the cache. The received sector 7 would be XORed with the old sector 7 and the result XORed with the old parity sector 7 to calculate the new parity sector 7 for updating the old parity sector 7 in the cache. The received sector 7 and the new parity 7 would be written to stripe 2. Therefore, assuming that the old data and/or old parity for sector 7 are not already in the cache, the updating of sector 7 of stripe unit D4, would require two reads and two writes. By updating data sector by sector, for multiple sectors in a stripe unit, the parity would need to be recalculated for each sector, which is detrimental to the performance of the RAID level 5 data storage system.

Therefore, it should be apparent to one skilled in the art that an improved method and system that permits updating of non-contiguous sectors of data in a data storage system is needed where input/output operations may be minimized.

SUMMARY OF THE INVENTION

It is therefore one object of the present invention to provide an improved data storage system.

It is another object of the present invention to provide an improved method and system for updating stored data in a data storage system.

It is yet another object of the present invention to provide an improved method and system for increasing performance of a data storage system in updating stored data with non-contiguous data utilizing data within a cache associated with the data storage system.

The foregoing objects are achieved as is now described. A method and system are disclosed for updating stored data with received data in a cache associated with the data storage system, where the data storage system comprises N data storage drives, where data and calculated parity are striped across N data storage drives, where a stripe comprises multiple data sectors on each of N data storage drives. An associated cache is provided with the data storage system into which data is received. The data in the cache is periodically examined to determine if the cache includes all sequential data sectors contained within a complete stripe within the data storage system. Parity is calculated for the complete stripe by first calculating a range of sectors between which all sectors received into the cache for the complete stripe fall. Next, only those sectors within the range of sectors which are not included in the data within the cache for the complete stripe are read from the N data storage drives into the cache. Finally, the range of sectors in the cache for the complete stripe are logically combined. The parity is calculated such that input/output operations within said data storage system are minimized.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 3 depicts a pictorial image of a single stripe of a RAID disk storage system according to the method and system of the present invention.

FIG. 6 illustrates a pictorial illustration of a cache associated with the data storage system including dirty pages A, B, C and D according to the method and system of the present invention.

FIG. 7 depicts a pictorial illustration of a scatter gather list associated with the cache according to the method and system of the present invention.

FIG. 8 illustrates a table comparing reads, writes and XOR calculations utilized to update the dirty data pages in FIG. 6 by sectors and by stripes according to the method and system of the present invention.

DESCRIPTION OF THE PREFERRED EMBODIMENT

Figure 1:
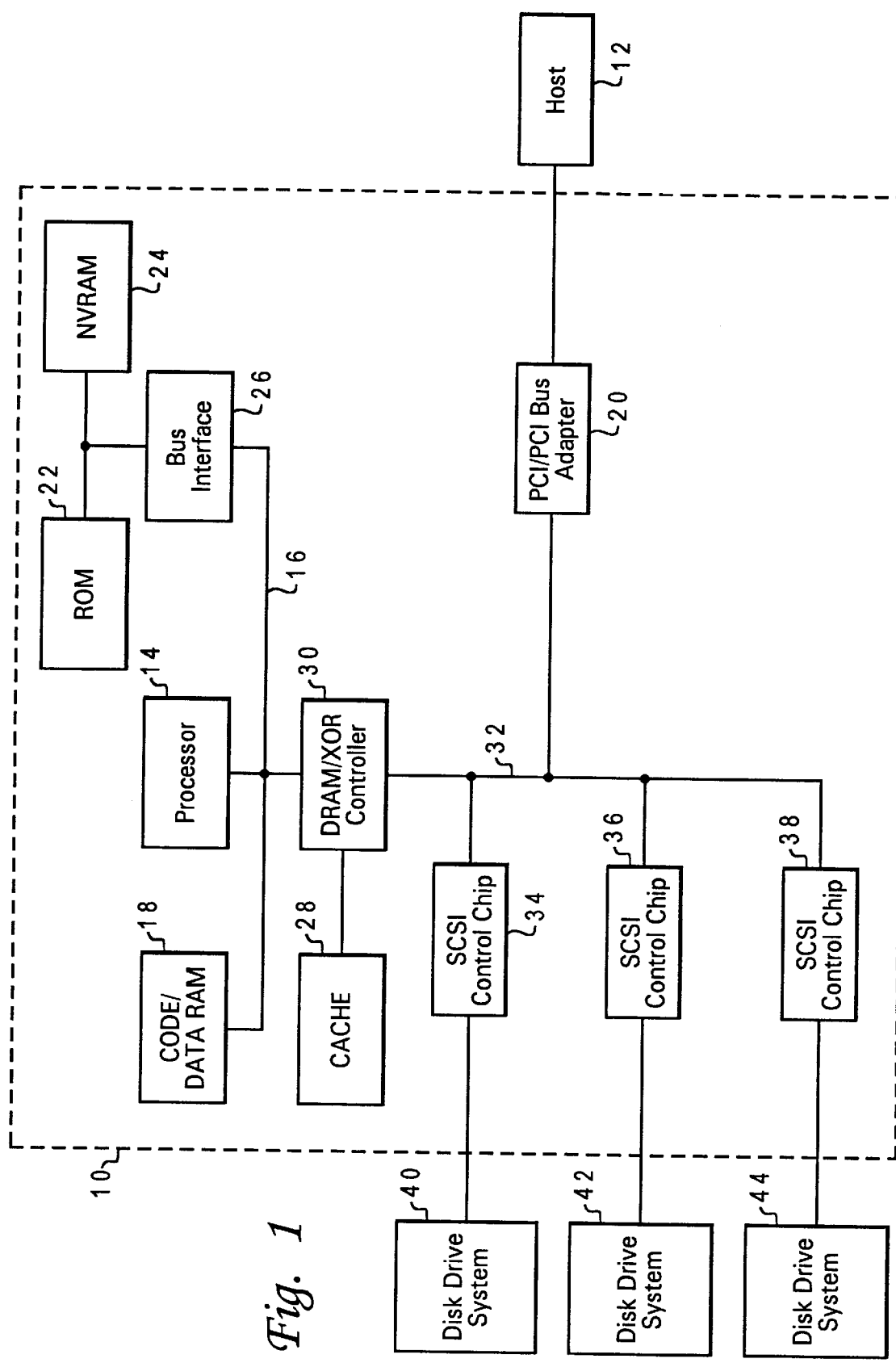
FIG. 1 depicts a high level block diagram of a data storage system which may be utilized according to the method and system of the present invention.

With reference now to the figures and in particular with reference to FIG. 1, there is depicted a high level block diagram of a RAID data storage system which may be utilized to implement the present invention. As depicted, RAID data storage system 10 is coupled to host processor 12 via PCI/PCI bus adapter 20. The data storage system 10 and host processor 12 may be incorporated in a single data processing system hardware unit, such as a general purpose digital computer (not shown). Alternatively, data storage system 10 may be incorporated into one data processing system hardware unit and host processor 12 may be incorporated into another data processing system hardware unit, such as the general purpose digital computer.

Host processor 12 may be implemented in a variety of data processing systems under a number of different operating systems. The data processing system may be, for example, a personal computer, a mini-computer, or a mainframe computer. The data processing system may be a stand-alone system or part of a network such as a local area network (LAN) or a wide area network (WAN).

As illustrated, processor 14 is utilized to control data storage system 10 which is preferably a RAID data storage system. Processor 14 is preferably an advanced microprocessor which is coupled to processor bus 16. As depicted, also coupled to processor bus 16 is code/data RAM 18 which is utilized to temporarily store code and data utilized by processor 14. ROM 22 and non-volatile random access memory (NVRAM) 24 are typically accessed utilizing an 8 bit bus and thus bus interface 26 is utilized to interface those devices to processor bus 16, which typically utilizes a 32 bit bus.

Operational code is typically stored within ROM 22, which, as those skilled in the art will appreciate, is generally provided utilizing so-called "flash" ROM. Operational code is thereafter fetched from ROM 22 by processor 14 upon initiation of operation to direct the operation of processor 14 to perform functions including the functions of the present invention. NVRAM 24 is typically a low power CMOS memory which is powered up for "back-up" by a battery such that the information stored in NVRAM 24 will not be lost when main power is terminated. Thus, NVRAM 24 may be utilized to store configuration data or operational code in a manner similar to that stored within ROM 22. ROM 22 is generally updated at initial power application and any changes to system configuration during operation are stored within NVRAM 24 and then entered into a "device change list" which is also stored within NVRAM 24 and on each disk drive within the system.

A cache 28 is also provided which is coupled to DRAM/XOR controller 30. Cache 28 may be configured into a plurality of temporary storage positions for data. DRAM/XOR controller 30 is utilized to control access to random access memory and also provides a hardware implemented exclusive or (XOR) circuit which may be utilized to rapidly and efficiently calculate parity for changes in updated data.

DRAM/XOR controller 30 is coupled to local bus 32. Also coupled to local bus 32 are multiple small computer system interface (SCSI) control chips 34, 36 and 38. Each SCSI control chip 34, 36 and 38 is defined as including channels which may each support a disk drive storage system comprising a plurality of disks. Those having ordinary skill in this art will appreciate that alternative bus architectures may be utilized to implement the data storage system; however, the depicted embodiment of the present invention utilizes multiple disk drive data storage systems 40, 42 and 44 which are configured in the SCSI bus architecture.

Figure 2:
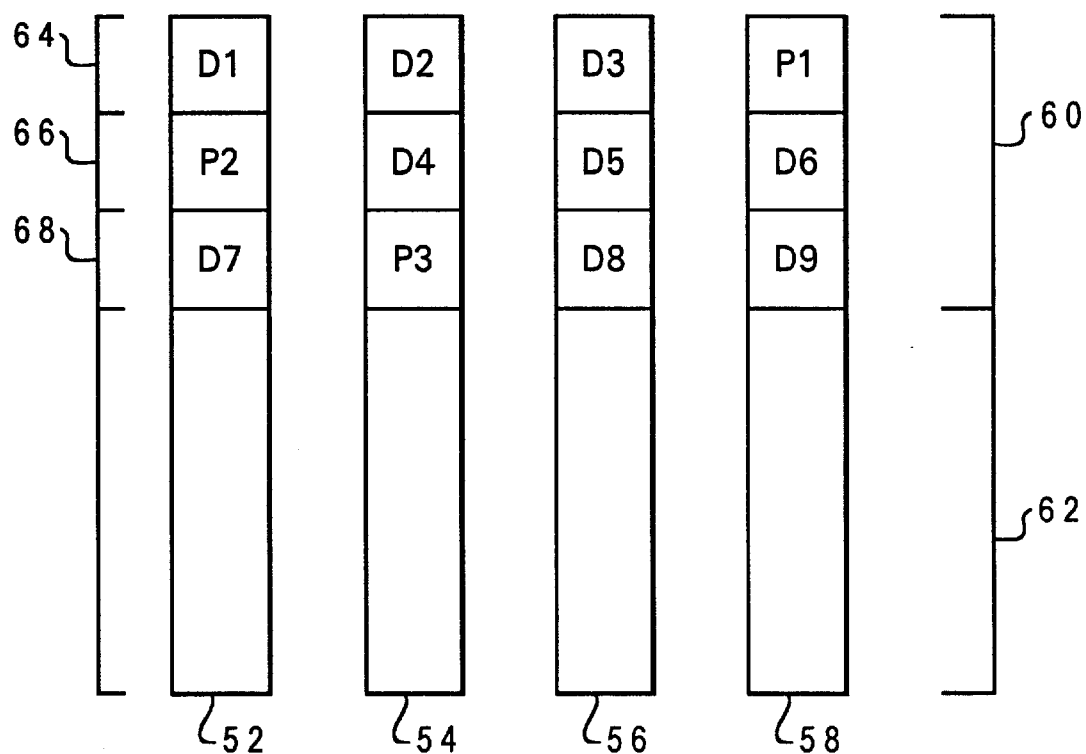
FIG. 2 illustrates a pictorial image of a RAID disk storage system according to the method and system of the present invention.

Referring now to FIG. 2, there is illustrated a pictorial image of a RAID disk drive system of the present invention. In the example shown, four physical drives 52, 54, 56 and 58 are depicted. A logical drive is distinguished as a cross section of the four physical drives 52, 54, 56 and 58 as illustrated at reference numeral 60. The remainder of the physical drives 52, 54, 56 and 58 depicted at reference numeral 62 may contain a plurality of stripes and/or distinguished logical drives. Three stripes are illustrated at reference numerals 64, 66, and 68 within the logical drive depicted at reference numeral 60. The portion of the cross section of each physical drive is a stripe unit.

For a RAID-5 data disk system shown, for the logical disk depicted at reference numeral 60, each stripe includes three stripe units of data which are labeled with a "D" and a stripe unit of parity which is labeled with a "P". The stripe depicted at reference numeral 64 includes stripe units D1, D2, D3, and P1. Next, the stripe illustrated at reference numeral 66 includes stripe units D4, D5, D6 and P2. Finally, the stripe depicted at reference numeral 68 includes stripe units D7, D8, D9 and P3. For other RAID levels, the distribution of data and parity will conform to the level specifications.

With reference now to FIG. 3, there is depicted a pictorial image of a single stripe of a RAID disk drive system of the present invention. The stripe illustrated is a more detailed block diagram of the first stripe depicted at reference numeral 64 of FIG. 2. The cross section of the first physical drive representing D1 is illustrated in FIG. 3 at reference numeral 80. Next, the cross section of the second physical drive representing D2 is depicted at reference numeral 82. The cross section of the third physical drive representing D3 is illustrated at reference numeral 84. Finally, the cross section of the fourth physical drive representing D4 is depicted at reference numeral 86.

Each cross section includes sixteen sectors illustrated as S0 through S15 for each physical drive D1, D2, D3 and D4. The size of each sector is equivalent and is typically 512 bytes. Therefore, depending on the stripe size, the number of sectors may be determined.

Figure 4:
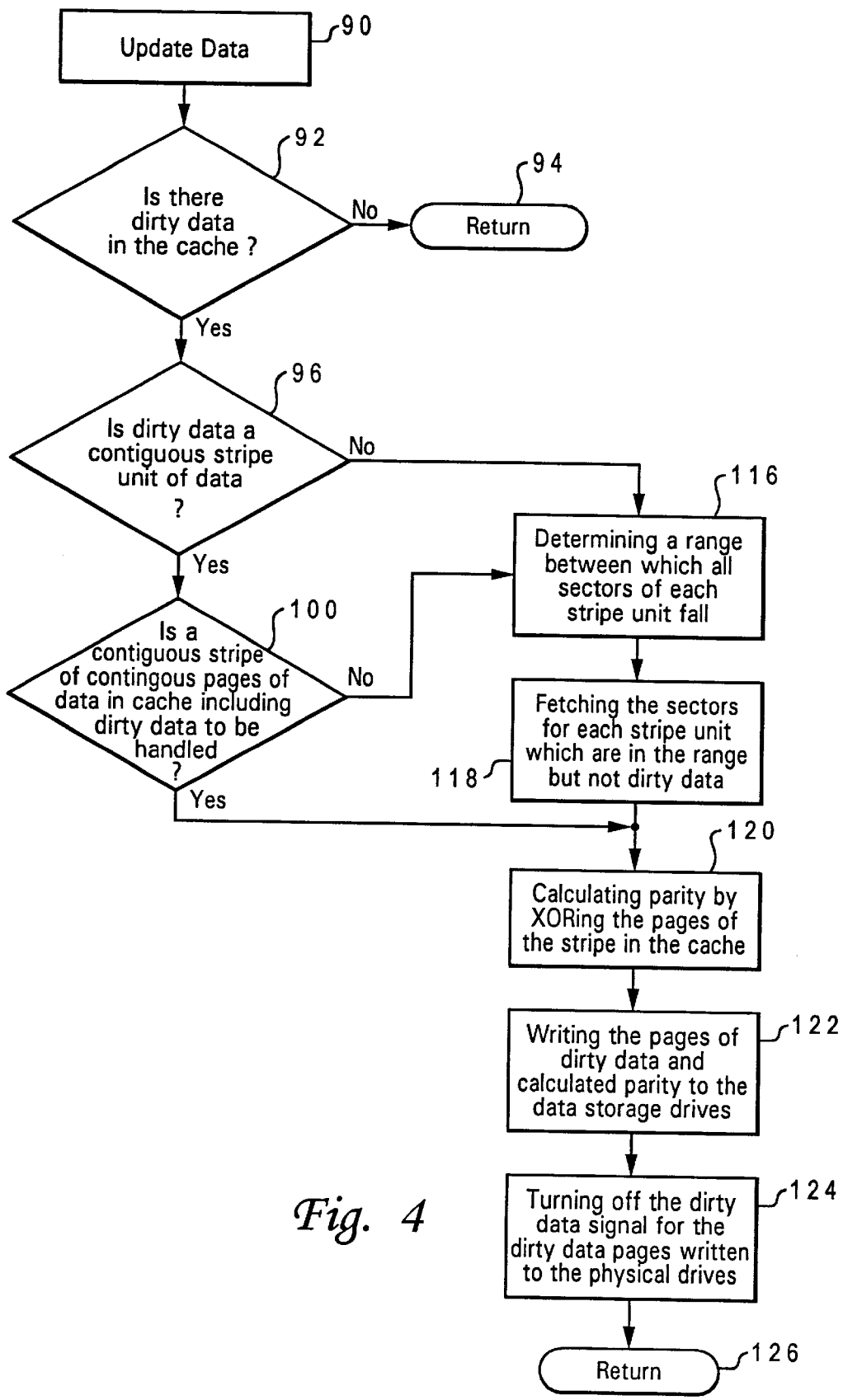
FIG. 4 illustrates a high level logic flowchart according to the method and system of the present invention.

Referring now to FIG. 4, there is illustrated a high level logic flowchart which illustrates the method of the present invention. It should be appreciated by those skilled in the art that FIG. 4 represents a self-consistent sequence of steps leading to a desired result. The steps are those requiring physical manipulation of physical quantities. Usually, although not necessarily, these quantities take the form of electrical or magnetic signals capable of being stored, transferred, combined, compared and otherwise manipulated. It has proven convenient at times by those skilled in the art to refer to these signals as bits, values, elements, symbols, characters, terms, numbers or the like. It should be born in mind, however, that all of these and similar terms are to be associated with the appropriate physical quantities and are merely convenient labels applied to those quantities.

Further, the manipulations performed are often referred to as terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data processing systems such as general purpose digital computers or other similar devices including data storage system 10. In all cases the distinction between the method operations and operating a computer and the method of computation itself should be born in mind.

The present invention relates to method steps for operating a processor such as processor 14 of FIG. 1, in processing electrical or other physical signals to generate desired physical signals. As illustrated, the process described in FIG. 4 begins at block 90 and thereafter passes to block 92. Multiple triggers in the operation of processor 14 may initiate the process which begins at block 90.

Block 92 depicts a determination of whether or not there is any dirty data present within the cache to be updated. If it is determined that there is not any dirty data present within the cache, the process merely returns to the process from which the present process was called, as depicted at block 94. However, in the event that there is dirty data present within the cache, the process passes to block 96. Block 96 depicts a determination of whether or not the dirty data page to be handled correlates with a contiguous stripe unit of dirty data present within the cache. If so, then the process passes to block 100. If not, then the process passes to block 116. Block 100 illustrates a determination of whether or not there is a contiguous stripe of contiguous pages of data present within the cache, including the dirty data page, to be handled. If not, the process passes to block 116. Otherwise, if there is a contiguous stripe of contiguous pages present within the cache, including the dirty data page, to be handled, then the process passes to block 120.

Block 116 depicts the determining of a range between which all sectors of each dirty data page in the stripe, including the dirty data, fall. Thereafter, the process passes to block 118. Block 118 illustrates the fetching of the sectors for each dirty data page from the stripe units which are in range but are not already dirty data sectors present within the cache. A scatter gather list may be utilized for each dirty page to read in the non-dirty sectors in the range from the data storage drives into the dirty data page. Thereafter, the process passes to block 120. Block 120 depicts the calculating of parity by logically combining the dirty data pages of the stripe. Typically, this logical combination is calculated by XORing the data as previously described; however, in other embodiments, other logical combinations of data may be utilized. For three pages of dirty data, the first two pages may be XORed and the third page XORed to the result. After block 120, the process passes to block 122. Block 122 illustrates the writing of the dirty data pages and the calculated parity from the cache to the data storage drives. Thereafter, the process passes to block 124. Block 124 depicts the turning off of the dirty data indication for each dirty data page written to the physical drives. After block 124, the process passes to block 126, where the process returns as depicted at block 126.

In the case at block 100 where there is a contiguous stripe of contiguous dirty data pages present within the cache, including the dirty data page, to be handled, the process first passes to block 120 and proceeds to blocks 122 and 124 as described above. Blocks 116 and 118 may be bypassed because there is no need to fetch non-dirty sectors into any of the dirty data pages in the stripe.

Figure 5:
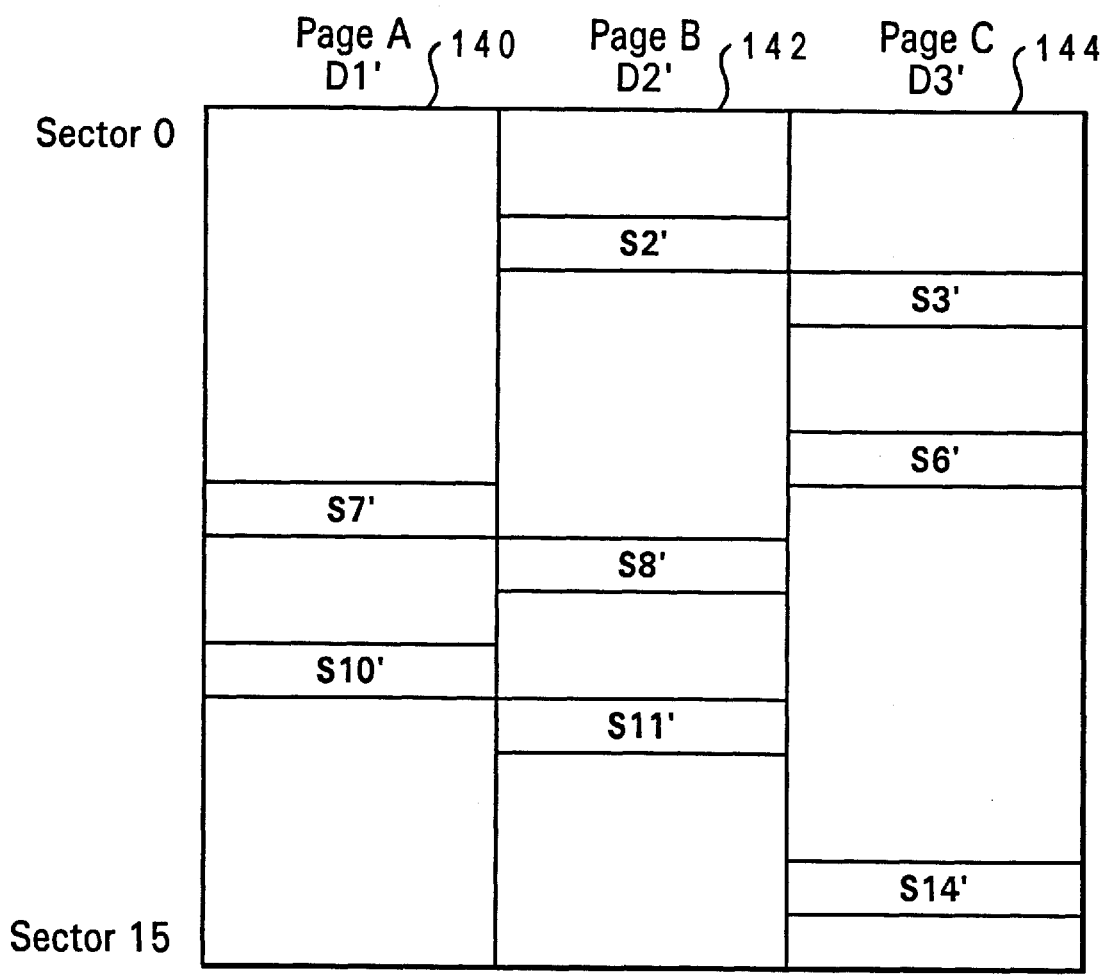
FIG. 5 depicts a pictorial illustration of a cache associated with the data storage system including dirty pages A, B and C according to the method and system of the present invention.

With reference now to FIG. 5, there is depicted a pictorial illustration of the cache associated with the data storage system according to the method and system of the present invention. In the example, the cache includes three pages of dirty data correlate with an entire contiguous stripe. However each dirty data page does not include data in all sectors. Each of the sectors of dirty data depicted herein includes a textual label "'" signifying a dirty data sector. Page A contains sectors S7' and S10' as illustrated at reference numeral 140. Next, Page B contains sectors S2', S8' and S11' as depicted at reference numeral 142. Finally, Page C contains sectors S3', S6' and S14' as illustrated at reference numeral 144. The dirty sectors shown are for illustrative purposes and may include any subset of the sectors available.

Referring now to FIG. 6, there is illustrated a pictorial illustration of the cache associated with the data storage system according to the method and system of the present invention. In the depicted example, the parity is calculated for the contiguous dirty data pages of FIG. 5 stripe by stripe. The range for all the pages is determined to fall between sector 2 and sector 14. As depicted at reference numeral 160, sectors S2–S14 are fetched from the stripe unit D1, however only S2, S3, S4, S5, S6, S8, S9, S11, S12, S13, and S14 placed on data page A utilizing a scatter gather list.

FIG. 7 depicts an example of a scatter gather list which may be utilized to obtain the data page A illustrated at reference numeral 180. During a read operation from the contiguous stripe unit, the contiguous stripe unit is scattered into non-contiguous sectors in a dirty data page in the cache in order to achieve a contiguous range of sectors in the dirty data page. The scatter gather list (SGL) may be located in memory such as RAM 18 of FIG. 1 to keep track of the address to which the data should be scattered and the byte count of the divided memory. The dirty data sectors are marked in the SGL such that all dirty data sectors are sent to a garbage page and all valid data sectors are sent to data page A. In the example, sectors 7 and 10 are dirty and therefore sent to the garbage page. Sectors 2, 3, 4, 5, 6, 8, 9, 11, 12, 13 and 14 are valid and will be scattered into dirty data page A. In FIG. 7, the address is signified by the page and the sector, however in other embodiments, a numerical address may be illustrated.

With reference again to FIG. 6, the non-dirty sectors in the range for dirty data pages B and C are also fetched from stripe units D2 and D3 utilizing a scatter gather list as depicted at reference numerals 162 and 164. With a complete contiguous range of sectors in the range for each of the dirty data pages, the new parity may be calculated and stored at page D. To calculate parity, page A is XORed with page B and the result is XORed with page C. Other logical combinations and order of logical combination may also be utilized. As illustrated at page D at reference numeral 166, the new parity data is considered dirty data S2' through S14'. With the parity calculated, the complete range of data in page A, page B, page C and page D may be written to stripe units D1, D2, D3 and D4 correspondingly and the dirty data page indication turned off for each page written.

Referring now to FIG. 8, there is illustrated a comparison of the number of reads and writes necessary to update the dirty data in the example pages A, B and C using two methods. FIG. 8 is merely utilized as an illustration of the differences in operations utilized by each method for a given example and is in no way meant to limit the invention to the example set of data.

Referring still to FIG. 8, using a sector by sector method, the parity is calculated for each sector individually and the dirty data is updated by sector. If the parity data for the sector is already in the cache, then the sector by sector method may utilize a minimum of 1 read, 2 writes and 1 XOR calculation per sector. If both the parity data and the sector data are fetched into the cache, the sector by sector method utilizes 2 reads, 2 writes and 1 XOR calculation per sector. In the example, page A contains 2 dirty data sectors and pages B and C each contain 3 dirty data sectors whereby 8 sectors will be updated sector by sector. The results of updating 8 sectors are illustrated at reference numeral 174 where 8–16 reads, 16 writes and 8 XOR calculations are utilized.

Alternatively, in the stripe by stripe method, the number of reads, writes and XOR calculations are minimized. The missing sectors in a range are read for each page in one read per page. The parity can be calculated utilizing the dirty pages already in the cache. All the dirty pages and new parity may be written in parallel with a write operation for each stripe unit. For the example, three pages A, B and C are contiguous and therefore may be updated using the stripe by stripe method to minimize input/output operations and XOR calculations. The result of updating pages A, B, and C regardless of the sectors included in each dirty page is 3 reads, 4 writes and 1 XOR calculations as illustrated at reference numeral 176 in FIG. 8.

While the invention has been particularly shown and described with reference to a preferred embodiment, it will be understood by those skilled in the art that various changes in form and detail may be made therein without departing from the spirit and scope of the invention.

For example, although examples have been illustrated for a RAID-5 data storage system, other RAID levels, such as RAID-0 and RAID-1, may also utilize the method and system according to the present invention.

Also, for example, although aspects of the present invention have been described with respect to a data storage system executing operational code that directs the method of the present invention, it should be understood that the present invention may alternatively be implemented as a program product for use with a data storage system or computer system. Programs defining the functions of the present invention can be delivered to a data storage system or computer system via a variety of signal-bearing media, which include, without limitation, non-writable storage media (e.g. CD-ROM), writable storage media (e.g. a floppy diskette or hard disk drive), and communication media, such as computer and telephone networks including ethernet. It should be understood, therefore, that such signal-bearing media, when carrying or encoding computer readable instructions that direct the method functions of the present invention, represent alternative embodiments of the present invention.

What is claimed is:

1. A method in a data storage system for updating stored data with received data in a cache associated with said data storage system, where said data storage system comprises N data storage drives, where data and calculated parity are striped across said N data storage drives, where a stripe comprises a plurality of data sectors on each of said N data storage drives, said method comprising the steps of:

receiving data into a cache associated with said data storage system, said data for updating stored data in said data storage system;

determining if said received data in said cache includes all sequential data sectors contained within a complete stripe within said data storage system;

calculating parity for said complete stripe by:
   calculating a range of sectors between which all sectors received into said cache for said complete stripe fall,
   reading from said N data storage drives into said cache only said sectors within said range of sectors which are not included in said received data in said cache for said complete stripe, and
   logically combining said plurality of sectors in said cache for said complete stripe, such that input/output operations within said data storage system are minimized.

2. The method in a data storage system for updating stored data with received data in a cache associated with said data storage system according to claim 1, further comprising the step of:

writing said range of sectors in said cache and said calculated parity across said N data storage drives for said stripe.

3. The method in a data storage system for updating stored data with received data in a cache associated with said data storage system according to claim 1 wherein said step of receiving data into a cache associated with said data storage system further comprises the steps of:

dividing the cache into a plurality of pages;

storing a predefined unit of said received data in each page of the cache; and associating a position in said N data storage drives with each said page of received data according to the stored data position which the received data will update.

4. The method in a data storage system for updating stored data with receive data in a cache associated with said data storage system according to claim 1 wherein said step of calculating parity for said complete stripe by logically combining said plurality of sectors in said cache for said complete stripe further comprises the step of:

XORing said plurality of sectors in said cache for said complete stripe.

5. A system in a data storage system for updating stored data with received data in a cache associated with said data storage system, where said data storage system comprises N data storage drives, where data and calculated parity are striped across said N data storage drives, where a stripe comprises a plurality of data sectors on each of said N data storage drives, said system comprising:

a cache associated with said data storage system for receiving data for updating stored data in said data storage system;

means for determining if said received data in said cache includes all sequential data sectors contained within a complete stripe within said data storage system;

means for calculating parity for said complete stripe by:
   calculating a range of sectors between which all sectors received into said cache for said complete stripe fall,
   reading from said N data storage drives into said cache only said sectors within said range of sectors which are not included in said received data in said cache for said complete stripe, and
   logically combining said plurality of sectors in said cache for said complete stripe, such that input/output operations within said data storage system are minimized.

6. The system in a data storage system for updating stored data with received data in a cache associated with said data storage system according to claim 5, further comprising:

means for writing said range of sectors in said cache and said calculated parity across said N data storage drives for said stripe.

7. The system in a data storage system for updating stored data with received data in a cache associated with said data storage system according to claim 5 wherein said cache associated with said data storage system further comprises:

means for dividing the cache into a plurality of pages;

means for storing a predefined unit of said received data in each page of the cache; and means for associating a position in said N data storage drives with each said page of received data according to the stored data position which the received data will update.

8. The system in a data storage system for updating stored data with received data in a cache associated with said data storage system according to claim 5 wherein said means for calculating parity for said complete stripe by logically combining said plurality of sectors in said cache for said complete stripe further comprises:

means for XORing said plurality of sectors in said cache for said complete stripe.

9. The system in a data storage system for updating stored data with received data in a cache associated with said data storage system according to claim 5 wherein said data storage system comprises a RAID data storage system.

10. A program product for updating stored data with received data in a cache associated with a data storage system, where said data storage system comprises N data storage drives, said program product comprising:

a data processing system usable medium; and a data updating program encoded within said data processing system usable medium that, in response to receiving data into said cache, determines if said received data in said cache includes all sequential data sectors contained within a complete stripe within said data storage system, and calculates parity for said complete stripe by:
    calculating a range of sectors between which all sectors received into said cache for said complete stripe fall;
    reading from said N data storage drives into said cache only said sectors within said range of sectors which are not included in said received data in said cache for said complete stripe; and
    logically combining said plurality of sectors in said cache for said complete stripe, such that input/output operations within said data storage system are minimized.

11. The program product of claim 10, wherein said data updating program writes said range of sectors in said cache and said calculated parity across said N data storage drives for said stripe.

12. The program product of claim 10, wherein said data updating program divides the cache into a plurality of pages, stores a predefined unit of said received data in each page of the cache, and associates a position in said N data storage drives with each said page of received data according to the stored data position which the received data will update.

13. The program product of claim 10, wherein said data updating product calculates parity for said complete stripe by XORing said plurality of sectors in said cache for said complete stripe.

\* \* \* \* \*